United States Patent [19]

Higashiyama et al.

[11] Patent Number: 5,252,315

[45] Date of Patent: Oct. 12, 1993

[54] PROCESS FOR PRODUCING LITHIUM ALUMINATE POWDER HAVING LARGE SPECIFIC SURFACE AREA

[75] Inventors: Kazutoshi Higashiyama, Nagoya; Susumu Yoshioka, Kawasaki; Tadayoshi Murakami, Hitachi, all of Japan

[73] Assignees: Hitachi, Ltd.; The Tokyo Electric Power Co., Inc., both of Tokyo, Japan

[21] Appl. No.: 331,301

[22] Filed: Mar. 31, 1989

[30] Foreign Application Priority Data

Apr. 1, 1988 [JP] Japan .................................. 63-78037

[51] Int. Cl.⁵ .............................................. C01F 1/00
[52] U.S. Cl. .................................................. 423/593
[58] Field of Search ........................................ 423/593

[56] References Cited

FOREIGN PATENT DOCUMENTS 207663 of 0000 European Pat. Off. .
157699 11/1988 Japan .

OTHER PUBLICATIONS

Abstract of Jpn Kokai Tokkyo Koho 87/105,093 (Apr. 28, 1987) publ. Chem Abstracts, vol. 110:157699x (1989).

Primary Examiner—Peter D. Rosenberg
Attorney, Agent, or Firm—Antonelli, Terry, Stout & Kraus

[57] ABSTRACT

A lithium aluminate powder having a large specific surface area can be produced by contacting a raw material powder of lithium aluminate with water singly or in the presence of an organic solvent having one or more hydroxyl groups to form a hydrate, followed by dehydration with heating.

9 Claims, 5 Drawing Sheets

1000Å

1000Å

PROCESS FOR PRODUCING LITHIUM ALUMINATE POWDER HAVING LARGE SPECIFIC SURFACE AREA

BACKGROUND OF THE INVENTION

This invention relates to a method for producing lithium aluminate ($LiAlO_2$) powder of which specific surface area has been enlarged by increasing its porosity.

Lithium aluminate ($LiAlO_2$) is resistant to the corrosive action of alkali carbonate, and it is used as a carrier of modified catalyst for internal modification type molted carbonate fuel cell.

According to prior processes, lithium aluminate is produced by heat-treating a mixture of lithium salt and aluminum salt, a mixture of lithium salt and aluminum oxide or a mixture of lithium hydroxide and aluminum oxide. Since all these prior processes are participated by a solid substance, the starting material must be pulverized and mixed with a greatest care in order to prevent the product from contamination of unreacted material as an impurity. Further, since these processes require a relatively high reaction temperature, the resulting powdery product generally has a small specific surface area.

On the other hand, according to a prior invention disclosed in Japanese Patent Application Kokai (Laid-Open) No. 53-140300, $\beta$-lithium aluminate is produced by precipitating $Li_2O.Al_2O_3.nH_2O$ from a solution containing lithium ion and ionic or elementary aluminum and heat-treating the precipitate at a temperature of 200° C. to 800° C. Although the above-mentioned problem can be avoided because the reaction of this process is carried out in a solution, this process requires to prevent the contamination of ionic impurities by regulating the molar ratio of lithium to aluminum and thoroughly washing the precipitate. In that specification, specific surface area of the lithium aluminate obtained by that invention is not mentioned.

The above-mentioned prior techniques are disadvantageous in the point of contamination of impurities into product. In order to avoid this contamination, a number of additive steps are considered necessary. Further, in these production processes, no sufficient measure is taken for obtaining a product having a large specific surface area.

SUMMARY OF THE INVENTION

An object of this invention consists in overcoming the above-mentioned disadvantages of prior techniques by providing a process for producing a lithium aluminate powder having a large specific surface area and well grown pores.

This invention provides a process for producing a lithium aluminate powder having a large specific surface area which comprises contacting a previously formed starting powder of lithium aluminate with water either singly or in the presence of an organic solvent having hydroxyl group to prepare a hydrate, followed by heating and dehydrating the hydrate.

DESCRIPTION OF THE PREFERRED EMBODIMENTS

Figure 1:
FIG. 1 is a transmitting electron microscopic photograph illustrating the particle structure of lithium aluminate crystal particle which has been made to have a large specific surface area and made porous.

According to this invention, a lithium aluminate powder having large specific surface area is produced in the following manners.

(1) A process for producing a lithium aluminate powder having a large specific surface area, which comprises contacting a $\gamma$-lithium aluminate powder with water to convert it to a hydrate, followed by heating the hydrate to decompose and remove the combined water.

(2) A process for producing a lithium aluminate powder having a large specific surface area, which comprises contacting a $\gamma$-lithium aluminate powder with a mixture comprising water and an organic solvent having at least one hydroxyl group such as an alcohol to convert the lithium aluminate powder to its hydrate, followed by heating the hydrate to decompose and remove the combined water.

(3) A process for producing a lithium aluminate powder having a large specific surface area, which comprises contacting a $\gamma$-lithium aluminate powder with a mixture comprising water and an organic solvent having at least one hydroxyl group while applying a shearing force to the powder to convert the powder to its hydrate, followed by heating the hydrate to decompose and remove the combined water.

(4) A process for producing a lithium aluminate powder, which comprises contacting a $\gamma$-lithium aluminate powder with water or with a mixture comprising water and an organic solvent having at least one hydroxyl group to convert the powder to a hydrate substantially represented by the following formula:

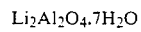

$$Li_2Al_2O_4.7H_2O$$

followed by heating the hydrate to decompose and remove the combined water and to make the powder porous.

In the above-mentioned processes, the temperature of heating is preferably 300° C. to 1,000° C. For example, when heated at 650° to 800° C., it takes about 1 hour to decompose the bonded water compared to about 100 hours when standing at 10° to 50° C.

The specific surface area of the lithium aluminate can be measured by, for example, a conventionally used nitrogen adsorption method. Preferable specific surface area is 30 $m^2/g$ or more, more preferably 40 $m^2/g$ or more, for example, 40 to 100 $m^2/g$.

The organic solvent having at least one hydroxyl group includes, for example, lower alcohols such as methanol, ethanol, propanol, etc.

The shearing force (or shear strength) can be applied by using conventionally used stirrers, mills, etc., under conventionally used conditions.

In the above reactions, when contacting with water, one mole of $LiAlO_2$ takes about 3.5 moles of crystal water into its structure to form a hydrate represented by $Li_2Al_2O_4 \cdot 7H_2O$ as follows:

$$2LiAlO_2 + 7H_2O \rightarrow Li_2Al_2O_4 \cdot 7H_2O \quad (4)$$

Since this hydrate itself has no large specific surface area and it grows up to a crystal rather greater than the original $LiAlO_2$ particle, the specific surface area tends to decrease in this reaction. However, if the crystal of hydrate is heated, the crystal water in the crystal structure is eliminate, and the crystal is modified to give a $LiAlO_2$ crystal having a greater specific surface area, preferably 2 times or more, than that of the original $LiAlO_2$ crystal. This is for the reason that the elimination of crystal water leaves minute pores in the structure and the pore thus formed is retained in the product.

Next, this invention will be explained by way of the following examples.

Example 1

One hundred grams of a starting $\gamma$-$LiAlO_2$ having a mean specific surface area of 22 m²/g and a mean particle diameter of about 0.1 μm was thrown into 350 g of distilled water and stirred at room temperature for 750 hours to prepare a hydrate. The hydrate thus obtained was separated from excessive water by filtration with suction and washed with ethanol.

Figure 2:
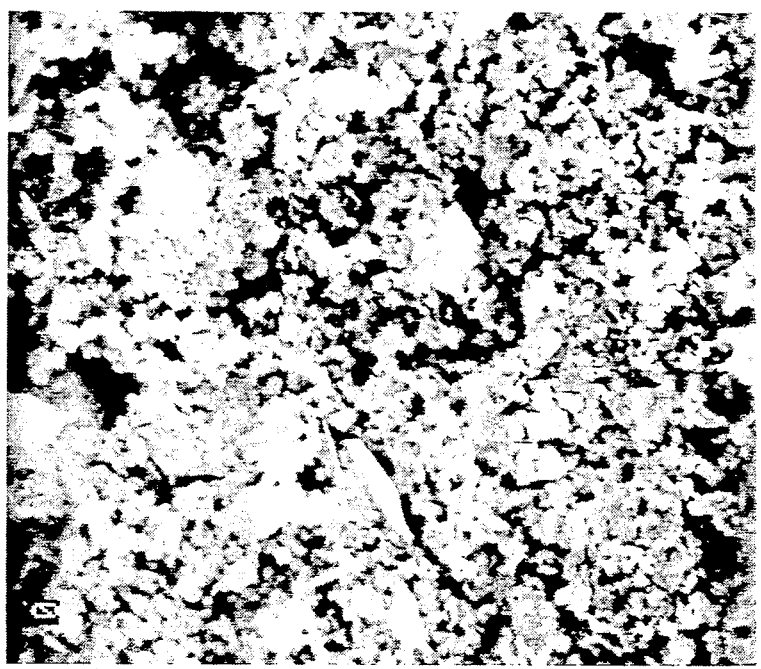
FIG. 2 and FIG. 3 are scanning electron microscopic photographs illustrating the particle structures of starting $\gamma$-$LiAlO_2$ powder and its hydrate crystal, respectively.
Figure 3:

FIG. 2 is a scanning microscope photograph (SEM) of the starting $\gamma$-$LiAlO_2$ used in this example, and FIG. 3 is a photograph of the hydrate crystal obtained by the above-mentioned process. While the starting powder was nearly spherical, the hydrate crystal had a hexagonal flaky shape. By X-ray diffraction, the hydrate was identified as $Li_2Al_2O_4 \cdot yH_2O$, and a thermogravimetric analysis revealed that the number of crystal water (y) was approximately equal to 7. Its crystal system was hexagonal system, which corresponded to the crystal from observable in FIG. 3. Further, the hydrate $Li_2Al_2O_4 \cdot yH_2O$ was heat-treated at 650° C., 800° C. and 900° C. for one hour.

Figure 4:
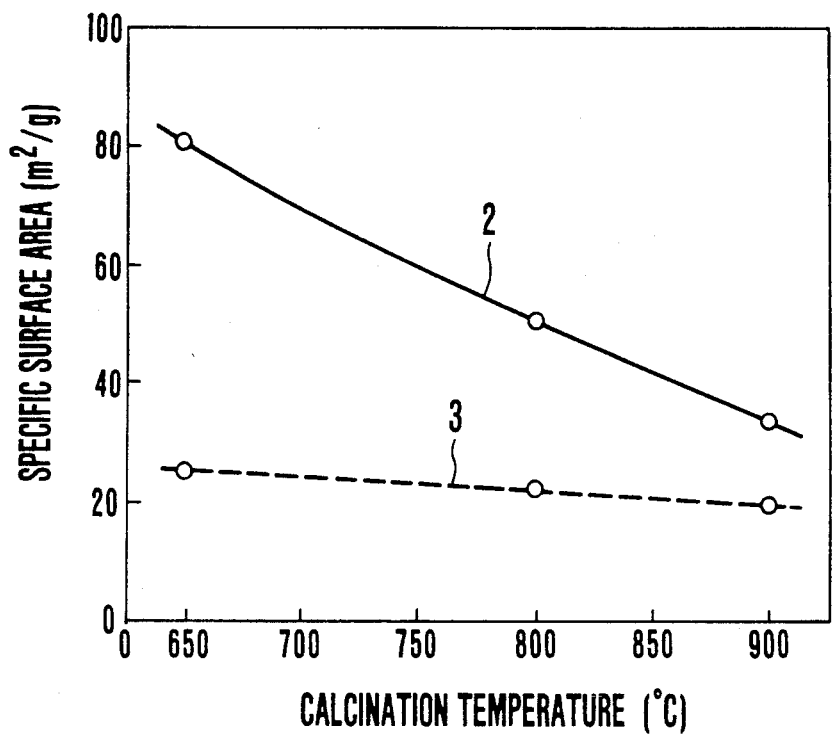
FIG. 4 and FIG. 5 are graphs illustrating specific surface area and pore volume distribution, respectively, of a hydrate heated at various temperatures.

In FIG. 4, Curve 2 illustrates the specific surface areas of the heated products determined by $N_2$ adsorption method. The starting $\gamma$-$LiAlO_2$ had a specific surface area of 22 m²/g. On the other hand, all the heated products had a larger specific surface area than above, regardless of the temperature of heating. Thus, when the temperature of heating was 650° C., 800° C. and 900° C., the specific surface area increased to about 4 times, about 2.5 times and about 2 times greater values, respectively, as compared with the starting material. Curve 3 is a comparative curve expressing the specific surface area of the same starting $\gamma$-$LiAlO_2$ which had been heated as it was under the same conditions as above.

Figure 5:
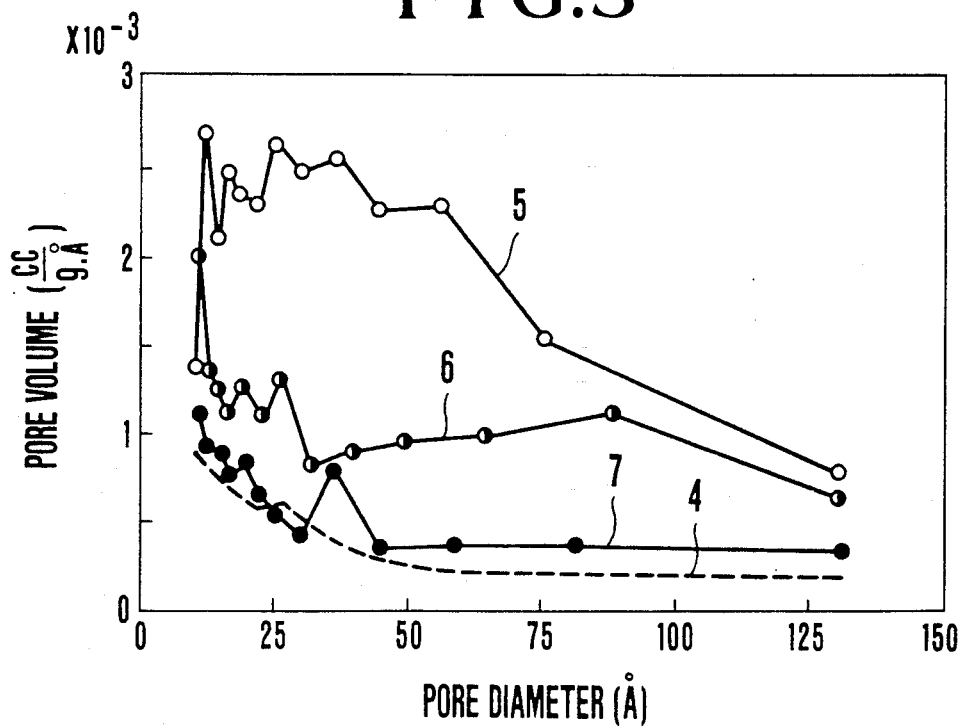

FIG. 5 illustrates the pore diameter distribution of heated product, wherein Curve 5 expresses that of a product heated at 650° C., Curve 6 is that of a product heated at 800° C., and Curve 7 is that of a product heated at 900° C. Curve 4 expresses the pore diameter distribution of starting $\gamma$-$LiAlO_2$. As compared with starting $LiAlO_2$, the products prepared by heat-treating the hydrate were evidently greater in pore volume.

FIG. 1 illustrates a transmitting electron microscopic photograph of a sample prepared by heating a hydrate at 650° C. There are observable fine particles of 100–200 Å in the particle, and there are formed pores of about 50 Å between the particles.

Example 2

In this example, the hydrate obtained in Example 1 was heated at 650° C. for a period of 1, 3, 6 and 10 hours.

Figure 6:
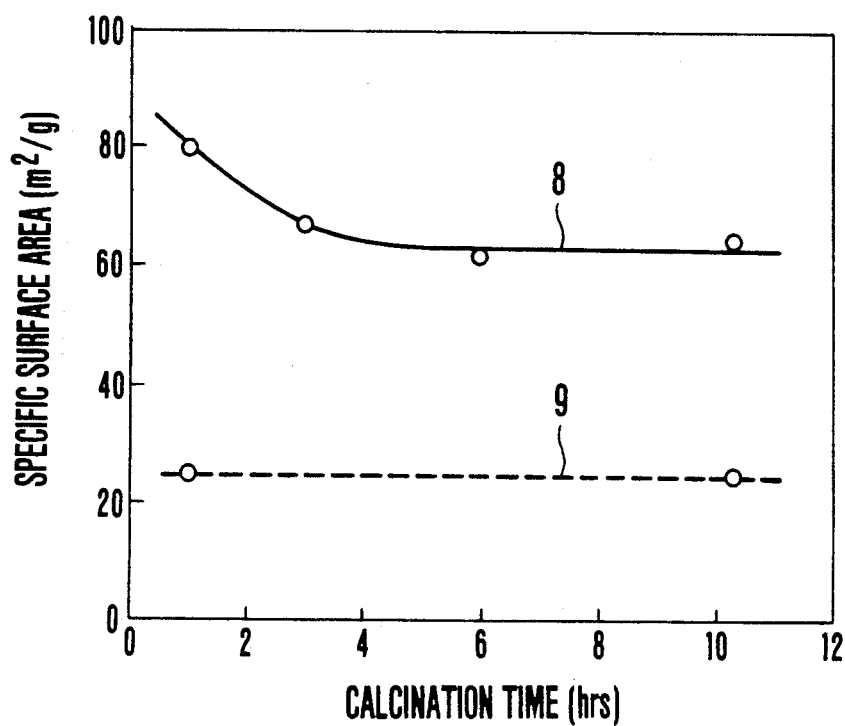
FIG. 6 and FIG. 7 are graphs illustrating specific surface area and pore volume distribution, respectively, of a hydrate heated at 650° C. for various periods of time.

In FIG. 6, Curve 8 expresses the change in specific surface area as a function of heating time. The specific surface area somewhat decreases till the heating time reaches about 3 hours. After this time, the specific surface area does not change and keeps constant at about 60 m²/g. Curve 9 expresses the change in specific surface area observed when the starting $\gamma$-$LiAlO_2$ is heated under the same conditions as above.

Figure 7:
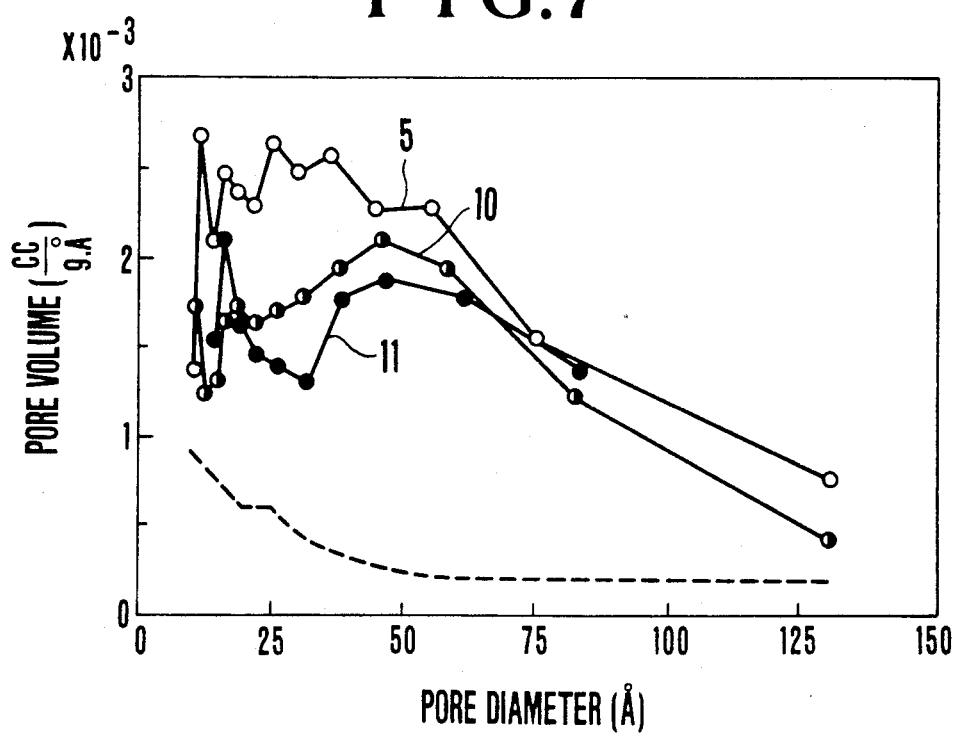

FIG. 7 illustrates pore diameter distribution of the heated product, wherein Curve 5 denotes a heating at 650° C. for one hour, Curve 10 denotes a heating at 650° C. for 3 hours and Curve 11 denotes a heating at 50° C. for 10 hours. Curve 4 expresses the pore diameter distribution of starting $\gamma$-$LiAlO_2$. In all these cases, pore volume is larger in heated product than in starting powder.

Example 3

Figure 8:
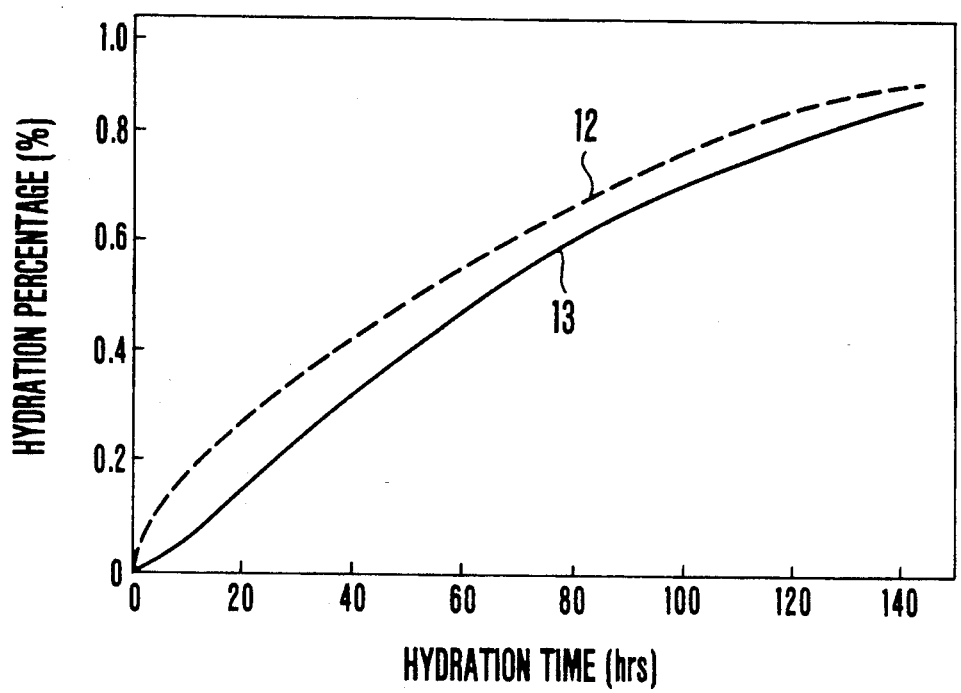
FIG. 8 and FIG. 9 are graphs illustrating the hydration velocity of starting powders.

If the hydration is carried out with a large quantity of water, the quantity of by-product formed by hydrolysis contaminating the hydrate becomes not negligible. The present example is effectively applicable to such a case. For instance, 100 g of the same starting powder of $\gamma$-$LiAlO_2$ as in Example 1 (specific surface area 22 m²/g) was thrown into 300 cc of ethanol. While stirring the mixture with a stirrer, 96 g of distilled water was dropped into it over a period of 140 hours. This quantity of distilled water (96 g) corresponded to the quantity of crystal water in the hydrate represented by formula (4) formed from 100 g of $\gamma$-$LiAlO_2$. In FIG. 8, Curve 13 expresses the hydration velocity under this condition, while Curve 12 expresses the hydration velocity under the condition of Example 1, wherein hydration rate (ordinate) is the ratio of actual quantity of crystal water to the theoretical quantity of crystal water. It is apparent from FIG. 8 that the hydration velocity in this invention (Curve 13) is comparable to that of Curve 12. Since in this example a necessary minimum quantity of water was used and the alcohol exhibited an inhibitory effect on hydrolysis, no impurity (i.e. hydrolyzate) was found in the hydrate obtained by a thermal aging for 100 hours followed by a separation by filtration.

Example 4

Figure 9:
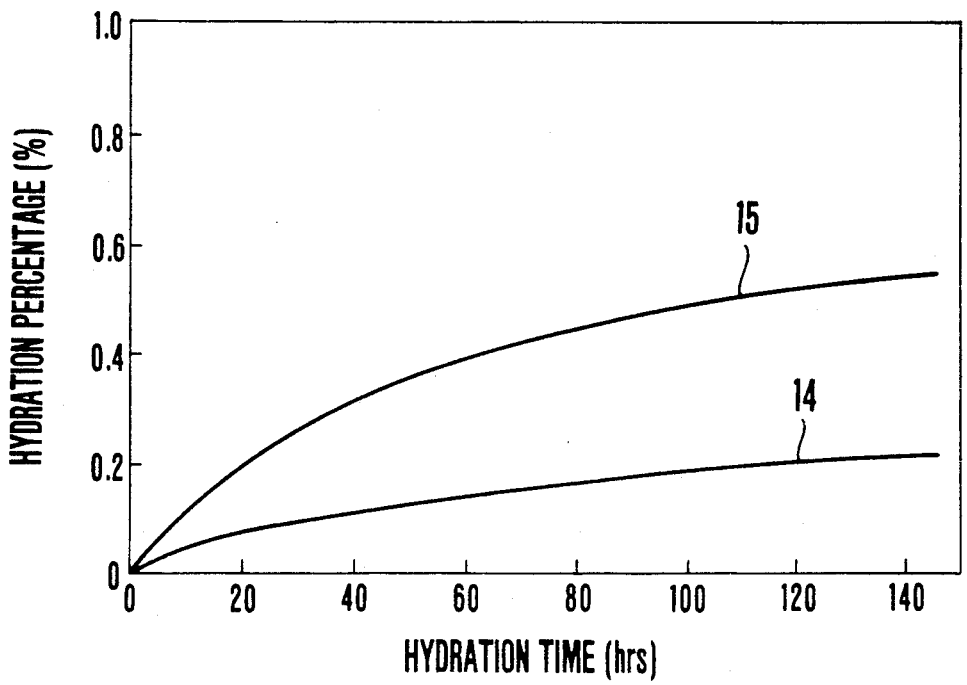

Herein is shown one example of hydration process successfully applicable to a case in which starting powder has a small specific surface area. In FIG. 9, Curve 14 expresses the hydration velocity observed when a $\gamma$-$LiAlO_2$ having a specific surface area of 3 m²/g is hydrated under the same conditions as in Example 1. The velocity herein shown is much lower than that expressed by Curve 12 of FIG. 8 (specific surface area 22 m²/g). The increase in specific surface area after heating and dehydration greatly varies depending on the hydration rate. If heating and dehydration are carried out in a state of low hydration rate, the increase in specific surface area is not great.

In this example, 100 g of a starting $\gamma$-$LiAlO_2$ powder having a specific surface area of 3 m²/g and 350 g of distilled water were thrown into a porcelainous ball mill, and hydration was carried out while pulverizing the powder by rotating the mill. At this time, the hydration velocity so increased as expressed by Curve 15 of FIG. 9. A similar effect can be achieved by simultaneously carrying out hydration and pulverization not only with ball mill but also with mortar grinder, vibrating mill and the like. As the hydration progresses and a layer of hydrate is formed on the surface of starting powder, the hydration velocity decreases. The ultimate hydration rate is lower when the initial specific surface area is smaller.

This example is effective for breaking the hydrate layer formed on the surface and thereby promoting the contact between unhydrated material and water.

Example 5

If the amount of water added to starting material is decreased and the starting material particles are left in a state of intimate mutual contact, the crystal of the hydrate grows while filling the interstices between starting material particles and combining the individual particles, whereby a rigid product is formed.

Thus, in this example, 20 g of $\gamma$-LiAlO$_2$ was mixed with 19 g of distilled water and a powder of a substance making a large contact angle with molten salt, such as metal nitride and the like, and the mixture was homogenized by means of a kneader, after which the mixture was formed in a desired shape. After hydration and hardening had took place, it was heated and dehydrated.

The formed product of lithium aluminate thus prepared contained in itself a molten salt-repelling material in a state of immobilized dispersion, and therefore it is useful as a carrier for internally modified catalyst used in the fuel circuit of fuel cell in order to modify the directly fed hydrocarbon such as CH$_4$ or the like.

According to this invention, starting material powder of lithium aluminate is contacted with water and heat-treated. By this simple procedure, specific surface area of lithium aluminate can be increased to 1.5 times or more, preferably 2 times or more, e.g. 2 to 4 times, and pores of about 50 Å can be formed. Accordingly, when the product of this invention is used as a carrier for internally modified catalyst placed in the fuel circuit of molten carbonate type fuel cell, it can exhibit a high modifying activity and a prolonged lifetime. Further, when it is used as a starting material for producing electrolyte plate of molten carbonate type fuel cell, the maintenance performance of electrolytic solution can be improved owing to its capillary action.

What is claimed is:

1. A process for producing a lithium aluminate powder having a specific surface area of at least 30 m$^2$/g, which comprises contacting a $\gamma$-lithium aluminate powder having a specific surface area less than 30 m$^2$/g with water to form a hydrate, followed by heating the hydrate to decompose and remove the combined water.

2. A process according to claim 1, wherein the decomposition and removal of combined water from the hydrate of $\gamma$-lithium aluminate are carried out at a temperature of 300° C. to 1,000° C.

3. A process for producing a lithium aluminate powder having a specific surface area of at least 30 m$^2$/g, which comprises contacting a $\gamma$-lithium aluminate powder having a specific surface area less than 30 m$^2$/g with water and a mixture comprising water and an organic solvent having at least one hydroxyl group to prepare a hydrate, followed by heating the hydrate to decompose and remove the combined water.

4. A process according to claim 3, wherein the decomposition and removal of combined water from the hydrate are carried out at a temperature of 300° C. to 1,000° C.

5. A process for producing a lithium aluminate powder having a specific surface area of at least 30 m$^2$/g, which comprises contacting a $\gamma$-lithium aluminate powder having a specific surface area less than 30 m$^2$/g with a mixture comprising water and an organic solvent having at least one hydroxyl group, hydrating said powder while applying a shearing force to the powder, and heating the resulting hydrate to decompose and remove the combined water.

6. A process according to claim 5, wherein the decomposition and removal of combined water from the hydrate are carried out at a temperature of 300° C. to 1,000° C.

7. A process for producing a lithium aluminate powder having a specific surface area of at least 30 m$^2$/g, which comprises contacting a $\gamma$-lithium aluminate powder having a specific surface area less than 30 m$^2$/g with water to convert the powder to a hydrate substantially represented by the following formula:

$$Li_2Al_2O_4.7H_2O$$

followed by heating the hydrate to decompose and remove the combined water.

8. A process according to claim 1, wherein upon removal of the combined water, the hydrate exhibits increased porosity.

9. A process for increasing a specific surface area of $\gamma$-lithium aluminate to at least 30 m$^2$/g, which comprises contacting a $\gamma$-lithium aluminate powder having a specific surface area less than 30 m$^2$/g with water to form a hydrate, followed by heating the hydrate to decompose and remove the combined water and to increase the porosity of the hydrate.

* * * * *